United States Patent [19]

Koller

[11] Patent Number: 5,078,507
[45] Date of Patent: Jan. 7, 1992

[54] TEMPERATURE SENSOR

[75] Inventor: Allen C. Koller, Hamilton, Ohio

[73] Assignee: General Electric Company, Cincinnati, Ohio

[21] Appl. No.: 670,857

[22] Filed: Mar. 18, 1991

[51] Int. Cl.⁵ .............................................. G01J 5/08
[52] U.S. Cl. .................................. 374/159; 374/131; 374/208
[58] Field of Search ............... 374/131, 139, 144, 155, 374/158, 208–210, 159, 161; 356/43–45; 250/227.14

[56] References Cited

U.S. PATENT DOCUMENTS

| Re. 33,245 | 6/1990 | Tojyo et al. | 374/131 |
|---|---|---|---|
| 3,626,758 | 12/1969 | Stewart et al. | 73/355 |
| 4,118,985 | 10/1978 | Compton | 73/346 |
| 4,468,771 | 8/1984 | Zhukov et al. | 374/131 |
| 4,576,486 | 3/1986 | Dils | 374/131 |
| 4,657,385 | 4/1987 | Pointer | 356/43 |
| 4,737,038 | 4/1988 | Dostoomian | 374/139 |
| 4,750,139 | 6/1988 | Dils | 364/557 |
| 4,770,544 | 9/1988 | Mossey | 374/144 |
| 4,794,619 | 12/1988 | Tregay | 374/131 |
| 4,845,647 | 7/1989 | Dils et al. | 364/557 |
| 4,859,079 | 8/1989 | Wickersheim et al. | 374/131 |

FOREIGN PATENT DOCUMENTS 0038980 3/1977 Japan .................................. 374/144

OTHER PUBLICATIONS

Harding et al., Oxidation Resistance of CVD Coatings, Feb. 1987, Air Force Rocket Propulsion Laboratory/-Report F04611-84-C-0043.
Mossey et al., "1700° C. Optical Temperature Sensor", Jul. 1986, Report No. CR-175108.

Primary Examiner—William A. Cuchlinski, Jr.
Assistant Examiner—W. Morris Worth
Attorney, Agent, or Firm—Bernard E. Shay; Jerome C. Squillaro

[57] ABSTRACT

A temperature sensor comprising a hollow shield including a cone shaped tip portion and a substantially cylindrical portion. The cylindrical portion surrounds a high temperature collection rod (e.g., a lightpipe or optical fiber). The collection rod is arranged to collect radiant energy from the cone shaped tip portion and transmit the radiation to a fiber optic cable attached to the opposite end of the collecting rod.

9 Claims, 1 Drawing Sheet

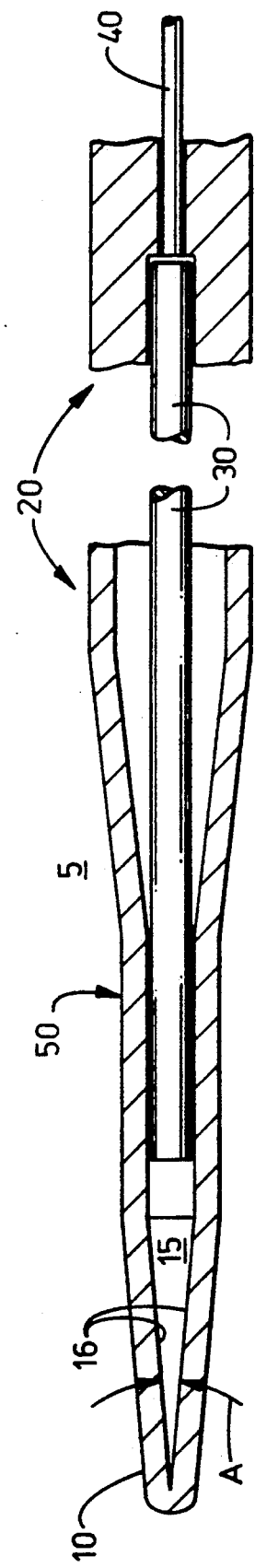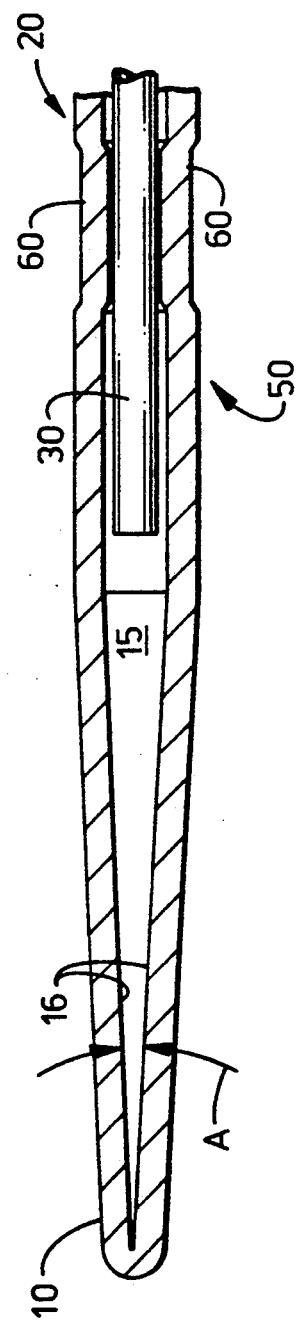

TEMPERATURE SENSOR

The present invention relates, in general, to temperature sensors and, more particularly, to an improved temperature sensor employing black body radiators and light pipes.

BACKGROUND OF THE INVENTION

It is desirable to be able to sense the temperature of a gas in an environment (e.g., a gas turbine engine) subject to vibration, high temperature, dirt and other factors which are generally abusive to scientific instruments. Known temperature sensors include thermocouples, pyrometers and black body temperature sensors. In one type of black body sensor, the tip of a high temperature lightpipe (e.g., a sapphire rod) is coated with a material (e.g., a noble metal) which forms a black body. Alternatively, a noble metal tip may be attached directly to the rod. When heated, the black body material emits radiation which is transmitted through the lightpipe to, for example, an optical fiber, this insulating the optical fiber from the high temperature environment. Examples of this type of temperature sensor are illustrated in U.S. Pat. Nos. 4,576,486, 4,859,079. This type of temperature sensor may not work well at high temperatures where the black body material may separate from the lightpipe. Further, since the lightpipe is not normally shielded, contamination may build up on its surface, degrading its optical transmission characteristics. Finally, mismatches in the thermal coefficient of expansion between the rod and the black body may degrade performance at high temperatures.

Alternative temperature sensors may employ a black body (e.g., a hollow core) which is separated from the optical fiber. Radiation from the black body may be focused on the tip of the collection fiber by, for example, a lens. Temperature sensors of this type are illustrated in U.S. Pat. Nos. 4,737,038 and 3,626,758. The size of this type sensor is limited by the size of the lens. This is a disadvantage because the accuracy of black body radiators of this type increases as the size of the black body decreases. Further, small sensors are advantageous because they are easier to shield and mount.

Pyrometers may use a first lens to collimate radiated energy which is transmitted through an inert gas and focused by a second lens onto, for example, an optical fiber.

SUMMARY OF THE INVENTION

The present invention is a temperature sensor comprising a hollow shield including a cone shaped tip portion and a substantially cylindrical portion. The cylindrical portion surrounds a high temperature collection rod (e.g., a lightpipe or optical fiber). The collection rod is arranged to collect radiant energy from the cone shaped tip portion and transmit the radiation to a fiber optic cable attached to the opposite end of the collecting rod. According to the present invention, the collecting rod is attached to the hollow shield in one place, near the collecting rod to fiber optic connection. Further, according to the present invention, the lightpipe is supported radially by, for example, raised portions within the cylindrical portion of the hollow shield such that the lightpipe is free to move axially with respect to the hollow shield.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIG. 1 illustrates one embodiment of the present invention.

FIG. 2 illustrates an expanded view of the embodiment illustrated in FIG. 1.

DETAILED DESCRIPTION OF THE INVENTION

According to the present invention, a temperature sensor 5 comprises a hollow shield 20 surrounding a collection rod 30. Temperature sensor 5 also includes optical fiber 40 which is optically coupled to one end of collecting rod 30.

Hollow shield 20 includes a cone shaped tip portion 10 and a substantially cylindrical portion 50. As illustrated in FIG. 2, cylindrical portion 50 includes raised support regions 60 arranged to support collecting rod 30. Hollow shield 20 may be any heat resistant material (e.g., a noble metal or alloy). Hollow shield 20 is intended to be a single piece which surrounds and protects collecting rod 20. It may be constructed of heat resistant material such as a platinum-rhodium alloy comprised of, for example 20% rhodium. Hollow shield 20 may, alternatively, be comprised of, for example, iridium or an alloy thereof.

The tip portion 10 of hollow shield 20 is adapted to be immersed in a fluid, when immersed in a fluid the temperature of tip portion 10 is approximately equal to the temperature of the surrounding fluid. The temperature of tip portion 10 is related to the radiation (e.g., infrared) emitted into hollow region 15. Thus, by measuring the radiation emitted by tip portion 10, the temperature of the fluid may be approximated. Measurement and system errors may be reduced or eliminated using a calibration technique such as immersing the sensor in a fluid having a known temperature.

Tip portion 10 is cone shaped and includes the external walls, internal walls 16 and hollow region 15. Radiation emitted from walls 16 of tip portion 10 may be collected by, for example, a collecting rod 30 disposed at the opening of tip portion 10.

The sensitivity of the sensor is a function of the size of tip portion 10, which is limited such that the temperature of tip portion 10 is substantially uniform. Sensitivity is also a function of solid angle A which is formed by interior walls 16. Therefore, because of the uniform temperature of tip portion 10 over the solid angle A the output is substantially insensitive to relative axial motion between the transmitting rod and the tip portion 10 resulting from thermal expansion and contraction.

Collecting rod 30 is a material of, for example, sapphire or any material suitable for transmitting radiation (e.g., infrared radiation). Collecting rod 30 may, alternatively, be comprised of a material such as zirconia (for example, zirconia fully stabilized with yitrria). Collecting rod 30 is arranged in cylindrical portion 50 such that one end of lightpipe 30 substantially fills the opening to tip portion 10. The end of collecting rod 30 facing conical tip portion 10 is arranged to collect substantially all of the radiation emitted by walls 16 of conical tip 10.

The end of collecting rod 30 may be polished to enhance its collection characteristics.

Cylindrical portion 50 is adapted to support lightpipe 30 and tip portion 10. In addition, cylindrical portion 50 is adapted to protect collecting rod 30. Cylindrical portion 50 includes raised support regions 60 which are designed to provide radial support for lightpipe 30 without constricting its axial movement. Since it is almost impossible to match the coefficient of thermal expansion of shield 20 and collecting rod 30, collecting rod 30 must be free to expand or contract within shield 20. Axial expansion of collecting rod 30 and the shield 20 may be substantial and as a result of their different coefficients of thermal expansion their relative expansion may differ substantially. Therefore, according to the present invention, the collecting rod is fixed to the shield at one point. Raised support regions 60 are adapted to provide radial support without constraining axial expansion and contraction of collecting rod 30 and may expand axially relative to the shield. Radial thermal expansion is negligible because the radius of collecting rod 30 and shield 20 is relatively small. Therefore, according to the present invention, raised support regions 60 are adapted to constrain radial movement of the collecting rod 30. The optical characteristics of collecting rod 30 may be degraded by contact between the interior walls of shield 20 or by any contaminants. Thus, by limiting the radial support to a few preselected points, the temperature sensor according to the present invention maintains a circumferential gap around the collecting rod which enhances the transmission characteristics of the rod by supporting collecting rod 30 at a limited number of points, the shield according to the present invention accommodates the mismatch in coefficient of thermal expansion without significantly degrading the optical characteristics of the collecting rod 30.

One method of forming raised portions 60 is to employ a rod (not shown) which is substantially equal to the diameter of collecting rod 30. The rod is inserted into shield 20 and the shield is crimped around the rod at preselected points. The rod may then be removed and collecting rod 30 inserted in its place. The crimp may be a continuous circular crimp as illustrated in FIG. 2 or a number of crimps disposed radially around shield 20. It is sufficient that collecting rod 30 be substantially radially constrained within shield 20.

As described previously, collecting rod 30 is normally attached to shield 20 at one point. This point is selected to minimize the effects of thermal expansion. Therefore, it is normally at or near the end of collecting rod 30 farthest from tip portion 10.

Optical fiber 40 may be connected to collecting rod 30 by conventional techniques. The connection between collecting rod 30 and optical fiber 40 is designed to optimize the transfer of radiation from collecting rod 30 to optical fiber 40. Collecting rod 30 must be long enough to isolate the optical fiber 40 from the temperature extremes.

Tip portion 10 may be designed such that the angle between walls 16 is approximately 20°±5°. This acute angle geometrically enhances the emissivity of tip 10 to approximately 1. Therefore, it minimizes the effect of emissivity changes in the tip material.

Tip 10 and rod 30 is arranged such that the face of rod 30 views a constant temperature region as it expands or contracts with respect to shield 20. The diameter of collecting rod 30 may be designed to substantially fill the opening of tip portion 10, thus maximizing the transfer of radiation from tip portion 10 to collecting rod 30 and enhancing the accuracy of the temperature sensor.

While preferred embodiments of the present invention have been shown and described herein, it will be obvious to those skilled in the art that such embodiments are provided by way of example only. Numerous variations, changes, and substitutions will now occur to those skilled in the art without departing from the invention be limited only by the spirit and scope of the appended claims.

It is claimed:

1. A hollow core temperature sensor comprising:
   a heat resistant shield having a hollow, cone shaped tip portion (10);
   a substantially cylindrical portion (50) surrounding a radiant energy collecting rod (30);
   a fiber optic cable (40) connected to an end of said cylindrical portion opposite said cone shaped portion, wherein said collecting rod is arranged to collect energy radiating from said cone shaped tip and transmit said energy to said optical fiber.

2. A temperature sensor according to claim 1 wherein:
   said cylindrical portion (50) includes a plurality of support regions adapted to radially support said collecting rod within said temperature sensor.

3. A temperature sensor according to claim 2 wherein:
   said collecting rod is a sapphire rod.

4. A temperature sensor according to claim 2 wherein:
   said collecting rod is free to move axially relative to said cylindrical portion; and
   said collecting rod is fixed at said end closest to said fiber optic cable.

5. A temperature sensor comprising:
   a hollow heat resistant shield comprising:
   a cone shaped tip portion;
   a cylindrical portion attached to said tip portion;
   a radiant energy collecting rod disposed within said cylindrical portion wherein said collecting rod is arranged to receive radiation emitted by said tip portion said temperature sensor further includes an optical cable arranged to received said radiation from said collecting rod.

6. A temperature sensor according to claim 5 wherein:
   said collecting rod is attached to said cylindrical portion at a single point near said optical cable.

7. A temperature sensor according to claim 6 wherein:
   said collecting rod is supported within said cylindrical portion hollow tube by a plurality of raised portions of said cylindrical portion.

8. A temperature sensor according to claim 6 wherein said collecting rod comprises:
   a zirconia rod.

9. A temperature sensor according to claim 6 wherein said shield comprises:
   iridium.

* * * * *